J. W. FERRY.
INK WELL.
APPLICATION FILED MAY 23, 1908.

917,573.

Patented Apr. 6, 1909.

Witnesses
Samuel Payne
K. H. Butler

Inventor
John W. Ferry.
By H. C. Everitt & Co.,
Attorneys.

UNITED STATES PATENT OFFICE.

JOHN W. FERRY, OF LIGONIER, PENNSYLVANIA.

INK-WELL.

No. 917,573.  Specification of Letters Patent.  Patented April 6, 1909.

Application filed May 23, 1908. Serial No. 434,506.

*To all whom it may concern:*

Be it known that I, JOHN W. FERRY, a citizen of the United States of America, residing at Ligonier, in the county of Westmoreland and State of Pennsylvania, have invented certain new and useful Improvements in Ink-Wells, of which the following is a specification, reference being had therein to the accompanying drawing.

This invention relates to ink wells, and the objects of my invention are, first, to provide an ink well that will not spill the contents thereof when accidentally tilted or upset; second, to provide an ink well of a novel construction that can be safely carried without having the contents thereof spilled; and third, to provide a simple, inexpensive and durable ink well of such a construction as to prevent rapid evaporation of the ink or writing fluid contained therein.

I attain the above objects by an ink well that will be presently described in detail and then specifically pointed out in the appended claim.

Figure 1:
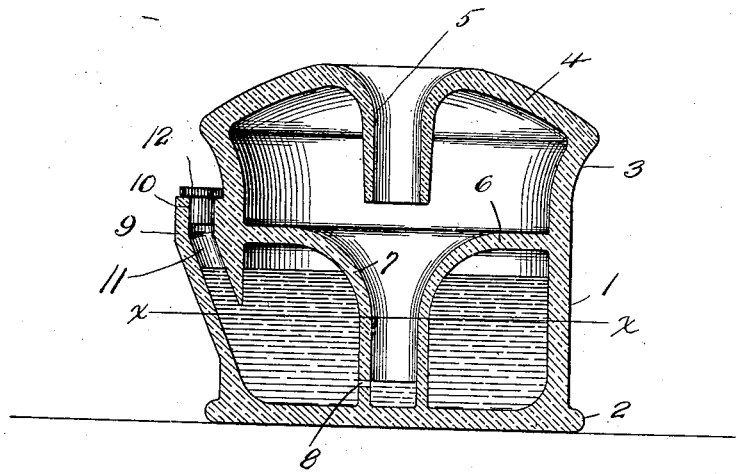
Figure 2:
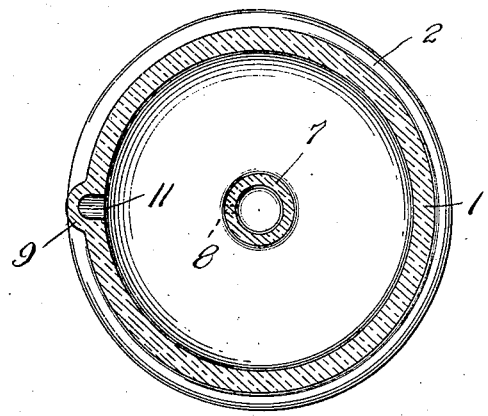

Referring to the drawings: Figure 1 is a vertical sectional view of an ink well constructed in accordance with my invention, and Fig. 2 is a horizontal sectional view taken on the line x—x of Fig. 1.

In the accompanying drawings, 1 designates a cylindrical receptacle having a flanged bottom 2 and flared upper edges 3 supporting a convex cover or plate 4, which is preferably made integral with the flared edges 3 of the receptacle. The convex cover or plate 4 is provided with a central depending funnel-shaped tube 5.

The receptacle 1 is provided with a horizontal partition 6 having a central depending funnel-shaped tube 7 connecting with the flanged bottom 2 of said receptacle, said tube adjacent to the bottom 2 being provided with a port or opening 8. The side of the receptacle is provided with an enlargement 9 having an opening 10 formed therein communicating with a bypath 11, said opening and bypath being employed for filling the ink well with ink or writing fluid. The opening 10 is normally closed by a stopper 12.

Ink or writing fluid within the ink well is confined within the receptacle beneath the horizontal partition 6, while a small quantity of the ink or writing fluid is allowed to flow through the opening 8 into the tube 7, where it can be easily reached by a pen inserted through the tube 5 into the tube 7. Should the ink well be accidentally upset or tilted, the ink within the tube 7 will flow into the space surrounding the tube 5, while the ink within the receptacle beneath the partition 6 will be retained therein. The space surrounding the depending tube 5 provides a sufficient reservoir for any ink or writing fluid that might escape when the ink well is upset. My ink well is preferably made of glass or a vitreous material and is preferably molded.

Having now described my invention what I claim as new, is:—

An ink well comprising a receptacle having a flat bottom and a convex cover with a central depending funnel-shaped tube, a horizontal partition disposed in said receptacle and forming an upper compartment and a lower compartment, said partition provided centrally thereof with a depending funnel-shaped tube having its lower end formed integral with the bottom of the receptacle, said tubes arranged in vertical alinement, the flaring portion of the lower tube being greater than the flaring portion of the upper tube said second mentioned tube having an opening therein in close proximity to the bottom of the receptacle and constituting a means for establishing communication between the second mentioned tube and the lower compartment, said receptacle having a lateral enlargement at one side thereof provided with an opening and with an inclined passage communicating with said lower compartment, said opening in the enlargement adapted to be closed by a stopper, and arranged in a plane above the plane of the partition.

In testimony whereof I affix my signature in the presence of two witnesses.

JOHN W. FERRY.

Witnesses:
MAX H. SROLOVITZ,
C. V. BROOKS.